(12) United States Patent
Hom et al.

(10) Patent No.: US 8,650,151 B2
(45) Date of Patent: Feb. 11, 2014

(54) TRANSACTIONAL SERVICE PIPELINE

(75) Inventors: Richard V. Hom, Troy, MI (US); Eric M. Nelson, Durham, NC (US); David C. Roxin, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/012,326

(22) Filed: Jan. 24, 2011

(65) Prior Publication Data
US 2012/0191643 A1 Jul. 26, 2012

(51) Int. Cl.
*G06F 17/00* (2006.01)
*G06F 7/00* (2006.01)

(52) U.S. Cl.
USPC .......................................... 707/607; 715/234

(58) Field of Classification Search
None
See application file for complete search history.

(56) References Cited

U.S. PATENT DOCUMENTS

| | | | |
|---|---|---|---|
| 7,412,551 B2 | 8/2008 | Bose et al. | |
| 2004/0213481 A1* | 10/2004 | Gershony et al. | 382/303 |
| 2007/0100724 A1* | 5/2007 | Hollas et al. | 705/36 R |
| 2007/0226196 A1* | 9/2007 | Adya et al. | 707/3 |
| 2008/0228697 A1* | 9/2008 | Adya et al. | 707/2 |
| 2009/0070271 A1* | 3/2009 | Sarkissian et al. | 705/75 |
| 2009/0080408 A1* | 3/2009 | Natoli et al. | 370/351 |
| 2009/0182816 A1 | 7/2009 | Yu | |
| 2010/0019045 A1* | 1/2010 | Sarkissian et al. | 235/492 |
| 2010/0250307 A1* | 9/2010 | Hollas | 705/7 |
| 2012/0179877 A1* | 7/2012 | Shriraman et al. | 711/141 |

OTHER PUBLICATIONS

Atif, Y., "Building Trust in E-Commerce", IEEE Internet Computing (Jan.-Feb. 2002), pp. 18-24; http//computer.org/internet/.
Chaiken, D. et al., "Software-Extended Coherent Shared Memory: Performance and Cost". Abstract, 11 pages, Year 1994.
Dayal, U. et al., "A Transactional Model for Long-Running Activities", Proceedings of the 17th International Conference on Very Large Data Based, Barcelona, Sep. 1991, pp. 113-122.
Rabbah, R. et al., "Data emapping for Design Spaces Optimization of Embedded Memory Systems", ACM Transactions in Embedded Computing Systems, Fall 2002, pp. 1-32.
Salva, S. et al., "Web Service Call Parallelization Using OpenMP". B. Chapman et al. (Eds): IWOMP 2007, LNCS 4935, pp. 185-194 (2008).
Suleman, M. et al., "Data Marshaling for Multi-core Architecture", Proceedings of the 37th Annual International Symposium on Computer Architecture, Jun. 19-23, 2010, Saint Malo, France, 10 pages.

* cited by examiner

*Primary Examiner* — Angelica Ruiz
(74) *Attorney, Agent, or Firm* — John R. Pivnichny; Keohane & D'Alessandro, PLLC (57) ABSTRACT

An approach for connecting the inputs and the outputs of multiple services in such a way that the entire transaction can be tracked from beginning to end and from service to service is provided. The pipeline architecture of the present invention passes information through a sequence of nodes, each node providing some processing or filtering before passing information to the next node in the pipe. A transaction's token passes down a pipe of services. The pipe can have forks and branches, so a transaction's token is passed from node to node carrying messages from one node to another. The overall transactional information is not lost from service to service; instead it is carried up and down the length of the pipeline. As the transaction's token is passed up and down the pipeline, its history passes with it. The pipe links a chain of nodes connected end-to-end.

20 Claims, 7 Drawing Sheets

TRANSACTIONAL SERVICE PIPELINE

FIELD OF THE INVENTION

The present invention generally relates to enterprise transactional services. Specifically, the present invention relates to a transactional service pipeline for connecting inputs and outputs of multiple services.

BACKGROUND OF THE INVENTION

Enterprises need a high performance mechanism to connect services together in an end-to-end fashion that preserves transactional integrity and history from the beginning of the string of services to the end of the string. One prior art approach uses an enterprise service bus (ESB), which is a software architecture construct that provides fundamental services for complex architectures via an event-driven and standards-based messaging engine (the bus). However, the ESB does not track the history of service-to-service interactions back to the originating service request. A bus architecture is designed for endpoint-to-endpoint communications, not a long string of interconnected points. When dealing with a series of three or more interconnected points, a pipeline architecture becomes much more suitable. However, the ESB does not provide an end-to-end history of the transaction or an end-to-end identity trace. For example, if the provider is also a consumer that needs something from another provider, that subsequent request is disconnected from the originating request.

Figure 1:
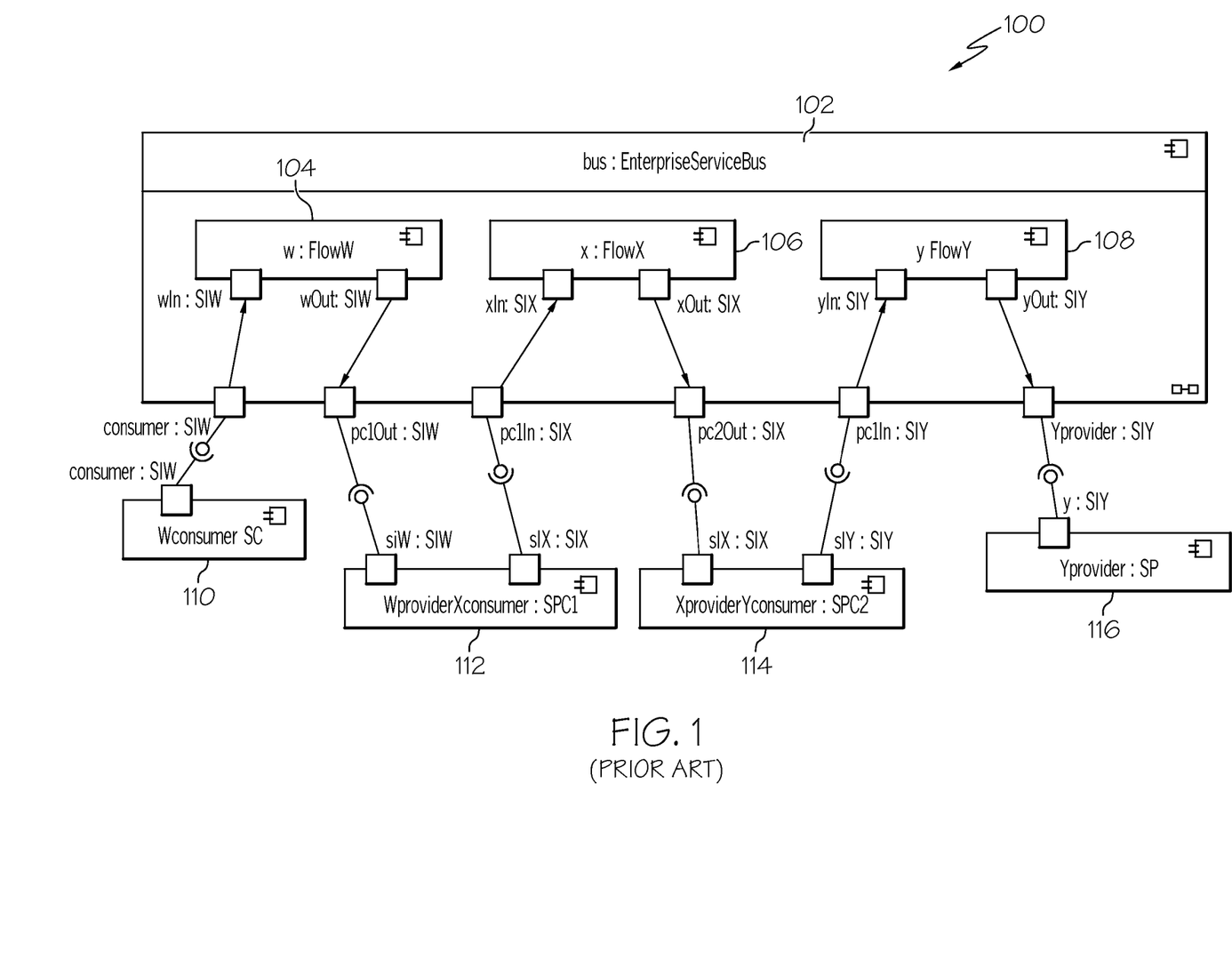
FIG. 1 shows an example of a prior art system that allows various elements on the bus to transfer data to other objects on the bus.

FIG. 1 shows a prior art system 100 including ESB 102 that allows a service consumer (SC) 110 to be connected to a service provider and consumer (SPC) 1 112. It also allows SPC1 112 to be connected to another service provider and consumer SPC2 114. It would also allow SPC2 114 to be connected to some service provider SP 116. They all execute independently with ESB 102 coordinating the communications between the service consumers and providers.

The prior art approach of FIG. 1 shows that all of the service providers and consumers are connected. As configured, one would assume that because of the connectivity, a request could be traced from the beginning at Wconsumer 110 to the end at Yprovider 116. In reality, however, ESB 102 does not provide this feature. From these relationships, Wconsumer 110 is connected to WproviderXconsumer SPC1 112 that is connected to XproviderYconsumer 114. It may not be known that WproviderXconsumer SPC1 112 is connected to XproviderYconsumer 114 in order to satisfy the original request of Wconsumer 110. From a representative or graphical perspective, it is not known that for SPC1 112, the outgoing request for X Flows 106 is the direct result of the incoming request for Wconsumer 110.

With an ESB, consumers and providers operate as disconnected transactions. The fact that WproviderXconsumer SPC1 112 is a consumer of XproviderYconsumer SPC2 114 is totally disconnected from XproviderYconsumer SPC2's 114 provision of X Flow 106 and SC's 110 consumption of w: FlowW 104.

Therefore, there exists a need for a solution that solves at least one of the deficiencies of the prior art approach shown in FIG. 1.

SUMMARY OF THE INVENTION

An approach for connecting the inputs and the outputs of multiple services in such a way that the entire transaction can be tracked from beginning to end and from service to service is provided. The pipeline architecture of the present invention passes information through a sequence of nodes, each node providing some processing or filtering before passing information to the next node in the pipe. A transaction's token passes down a pipe of services. The pipe can have forks and branches, so a transaction's token is passed from node to node carrying messages from one node to another. The overall transactional information is not lost from service to service; instead it is carried up and down the length of the pipeline. As the transaction's token is passed up and down the pipeline, its history passes with it. The pipe links a chain of nodes connected end-to-end.

In one embodiment, the present invention provides a system for connecting inputs and outputs of multiple services to track an entire transaction from beginning to end and from service to service in a pipeline architecture, the system comprising: a transactional service pipeline (TSP) having a series of nodes, each node providing processing or filtering before passing information to the next node in the TSP, and for passing information tracked by a token having an ID and context, through the TSP; one or more consumers using the TSP to receive the information, and potentially further process and pass on the information; and one or more providers used by the pipeline to receive and process the information.

In another embodiment, the present invention provides a method in a system having a transactional service pipeline (TSP) for connecting inputs and outputs of multiple services to track an entire transaction from beginning to end and from service to service, the method comprising: passing a transaction token up and down the TSP; passing the transaction token's history with the transaction token; and providing, by the TSP, provenance to one or more consumers.

In another embodiment, the present invention provides a computer-readable medium storing computer instructions, which, when executed, enables a system having a Transactional Service Pipeline (TSP) operating to connect inputs and outputs of multiple services to track an entire transaction from beginning to end and from service to service to perform steps comprising: passing a transaction token up and down the TSP; passing the transaction token's history with the transaction token; and providing, by the TSP, provenance to one or more consumers.

In another embodiment, the present invention provides a method for deploying a system for connecting inputs and outputs of multiple services of a transactional service pipeline (TSP) to track an entire transaction from beginning to end and from service to service, the method comprising: passing a transaction token up and down the TSP; passing the transaction token's history with the transaction token; and providing, by the TSP, provenance to one or more consumers.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

An approach for connecting the inputs and the outputs of multiple services in such a way that the entire transaction can be tracked from beginning to end and from service to service is provided. The pipeline architecture of the present invention passes information through a sequence of nodes, each node providing some processing or filtering before passing information to the next node in the pipe. A transaction's token passes down a pipe of services. The pipe can have forks and branches, so a transaction's token is passed from node to node carrying messages from one node to another. The overall transactional information is not lost from service to service; instead it is carried up and down the length of the pipeline. As the transaction's token is passed up and down the pipeline, its history passes with it. The pipe links a chain of nodes connected end-to-end.

Figure 2:
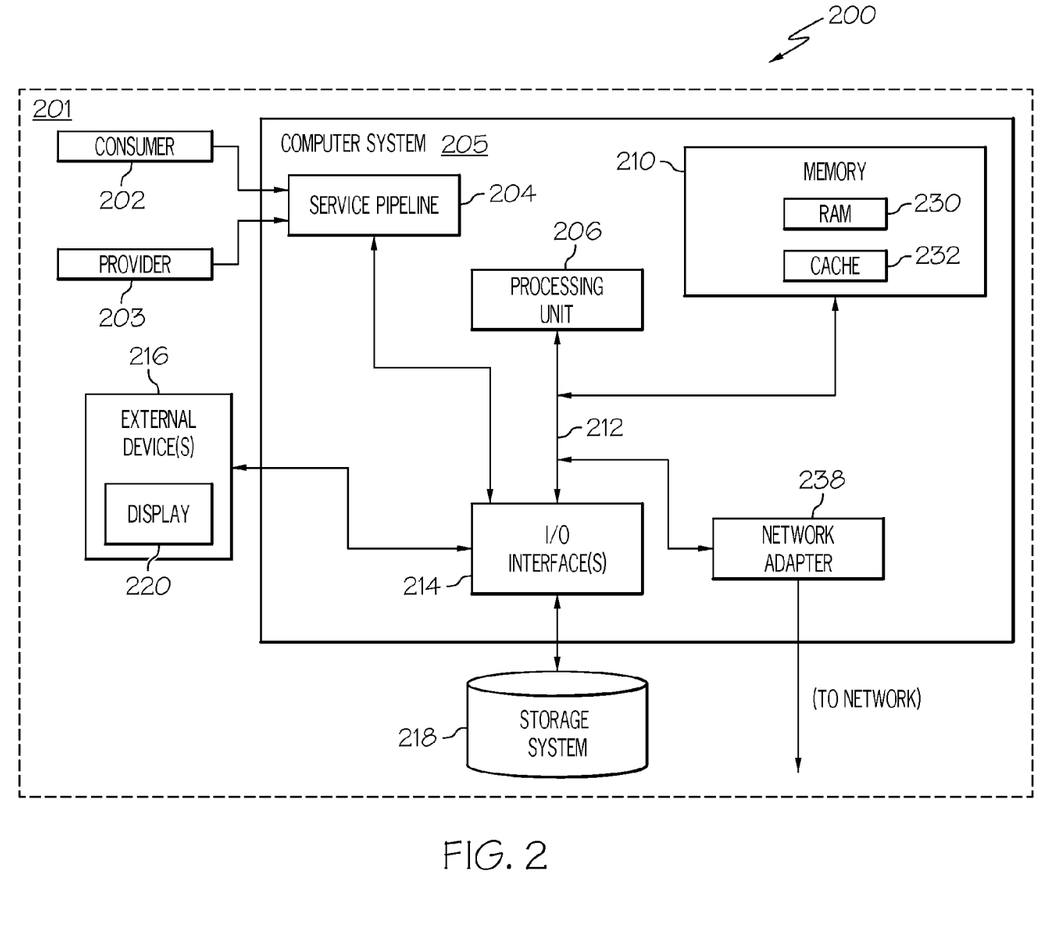
FIG. 2 shows a system that can implement the conceptual pipeline of the present invention according to embodiments of the present invention.

Embodiments of the invention operate within System 200, as shown in FIG. 2. System 200 includes Data Processing System 202, which is suitable for storing and/or executing program code of the present invention and may include at least one processor (Processing Unit 206) coupled directly or indirectly to Memory 210 through System Bus 212. Memory 210 may include local memory (RAM 230) employed during actual execution of the program code and cache memories (Cache 232) that provide temporary storage of at least some program code in order to reduce the number of times code must be retrieved from bulk storage (Storage System 218). During operation one or more consumers 202 use the service pipeline 204 (i.e., a transactional service pipeline) to receive information, and potentially further process and pass on the information. One or more providers 203 also use the pipeline to receive and process the information. Computer system 205 also includes I/O interfaces 214 that communicate with one or more external devices 216 that enable a user to interact with computer system 205 (e.g., a keyboard, a pointing device, a display 220, etc.)

Figure 3:
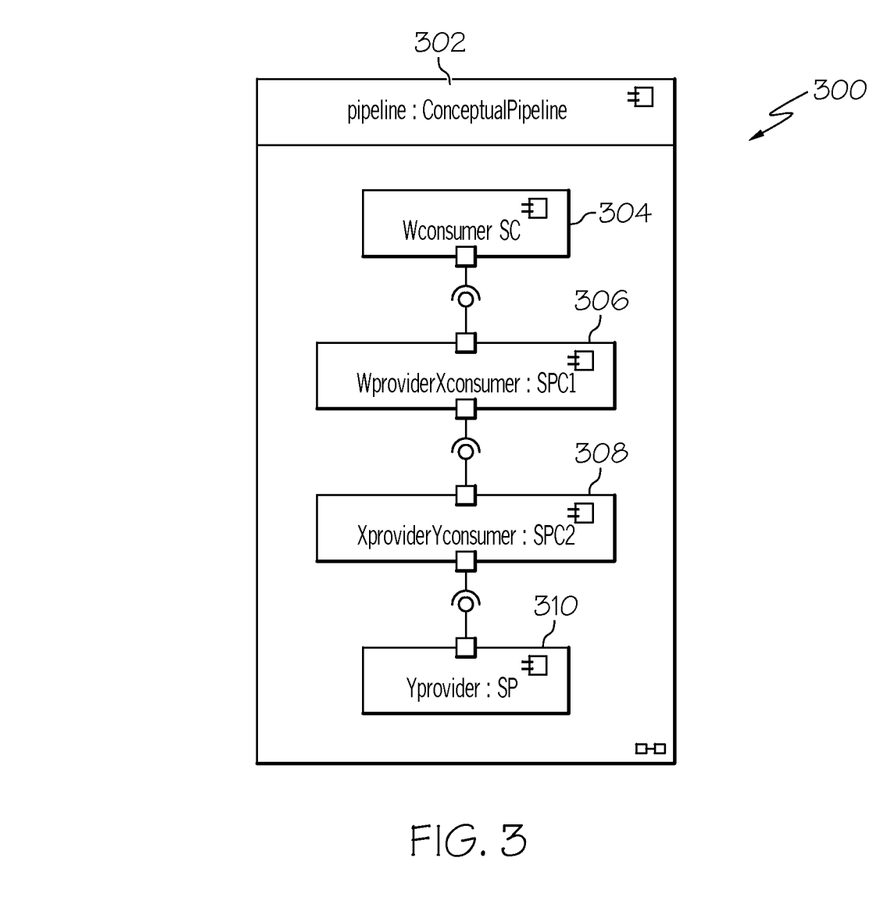
FIG. 3 shows a conceptual illustration of a TSP that uses a transaction's token, transaction context and pipeline address according to embodiments of the present invention.

Referring now to FIG. 3, a transactional service pipeline 300 (TSP) is shown. TSP 300 conceptually follows a pipeline architecture instead of a bus architecture as shown in the prior art approach of FIG. 1. This pipeline architecture passes information through a sequence of nodes, each node providing some processing or filtering before passing information to the next node in the pipe. In concept, a transaction's token passes down a pipe of services in the TSP 300. TSP 300 can pass a token along conceptual pipeline 302 from WConsumer 304 to WConsumerXProvider 306 to XProviderYConsumer 308 and to YProvider 310.

Figure 4:
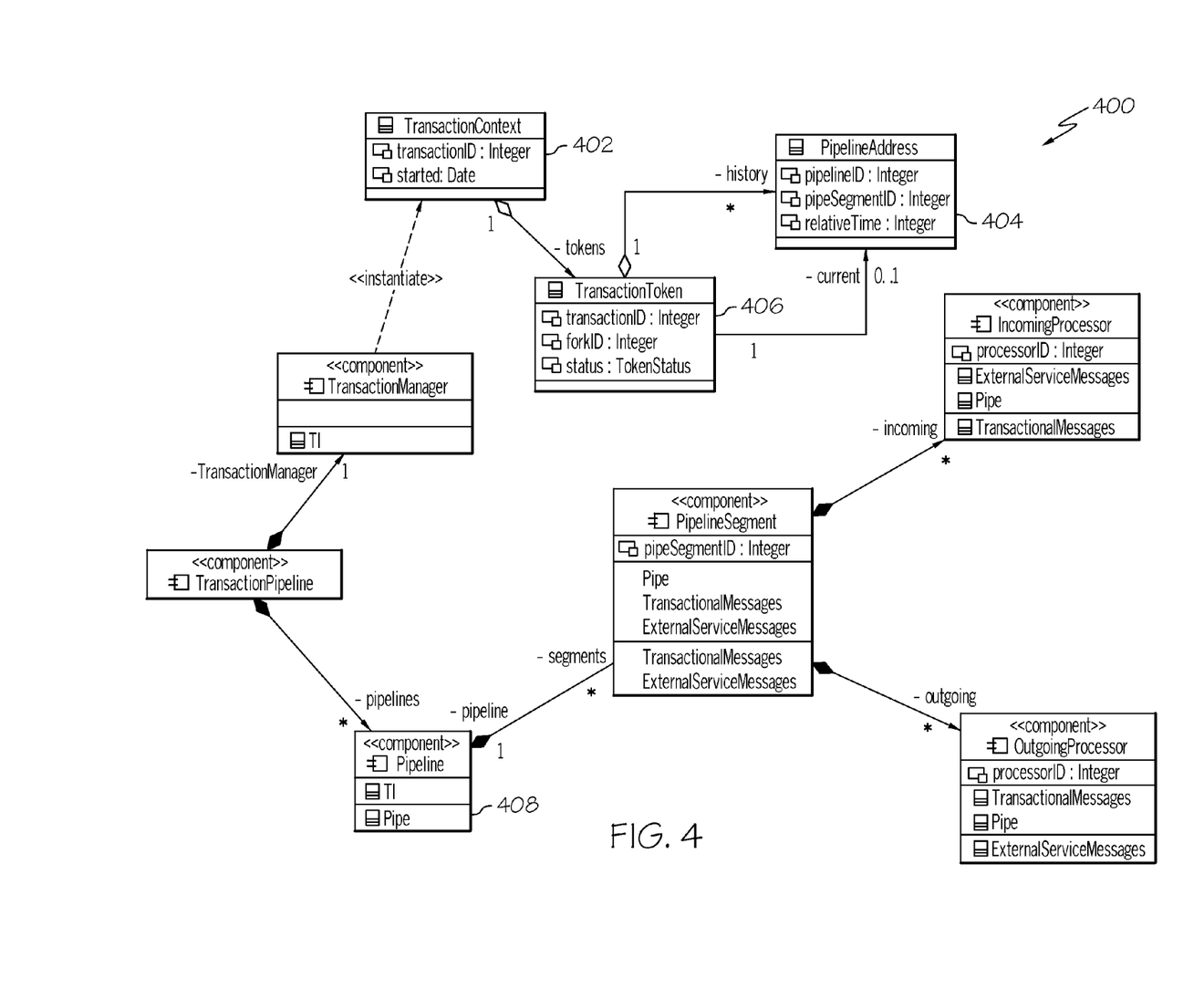
FIG. 4 shows the structure and relationships for a transactional pipeline and tracking a transaction through the use of transaction tokens and pipeline addresses according to embodiments of the present invention.

As shown in FIG. 4, pipe 400 can have a plurality of forks and branches, so a TransactionContext's (402) TransactionTokens 406 (instead of the token) are passed from node to node carrying messages to another. The overall transactional information is not lost from service to service; it is carried up and down the length of the pipeline 408. As TransactionToken 406 is passed up and down the pipeline, its history passes with it. Instead of the bus being in the center of uncoordinated nodes, pipe 400 surrounds and links a chain of nodes connected end-to-end.

The advantages include a provenance trackable transaction that spans all of the nodes in a pipeline from beginning to end, a transactional single sign-on identity for the entire pipeline that can be used for Database Management System (DBMS) level audit trails (lost using ESB), a lightweight architecture connecting services together with little overhead, and higher performance due to lower overhead. A Database Management System (DBMS) is a set of computer programs that controls the creation, maintenance, and the use of a database.

The present invention also provides for:
Lightweight Virtual Attribute Provenance Pipeline (LVAPP)—The LVAPP is used to connect Virtual Attribute Enabled Directories (VAED) to corresponding sources of data.
The LVAPP provides the provenance for requests to VAEDs. Because the data in a VAED is dynamic, provenance of the data in the LVAPP cannot be tracked as it would be in a traditional LDAP. In accordance with the present invention, the provenance is tracked as the request is made, and tracked through all of the sources needed to calculate the value of the virtual attribute.
Enterprise Services Pipeline (ESP)—The ESP falls between an LVAPP and a full Trust and Provenance Pipeline (TPP). The ESP would not require an XA interface of its services meaning that a transaction could not be rolled back if trust or provenance policies are not met.

TSP 300 (FIG. 3) of the present invention operates by providing an infrastructure for a pipeline services (or component) architecture that allows services to be connected end-to-end like segments in a pipeline. The output of one pipe segment feeds directly into the input of another segment as may be shown in FIG. 3. In implementation, each pipe segment is actually a proxy for a service. If one were to compare FIG. 3 and FIG. 6, the role in FIG. 3 (e.g., Wconsumer SC 304, WproviderXconsumer SPC1 306) stays inside pipe 602 (e.g., Wconsumer 608, WproviderXconsumer 610), but the implementation (e.g., Wconsumer SC 616, WproviderXconsumer SPC1 618) are moved outside of pipe 602. In pipe segment SCSegment (top center) 608 is a proxy for some service consumer SC (top right) 616, labeled as Wconsumer because it consumes some service interface W (SIW). The corresponding proxy internally is also labeled Wconsumer 608. The TSP infrastructure has a transaction manager 604 and multiple pipelines 606 that allows a service to participate in multiple pipelines instead of being dedicated nodes in a single pipeline. Each service that participates in a pipeline must be "TSP enabled" by accepting an envelope wrapped message and using that same envelope to place anything back on the pipeline. This envelope enables the TSP to tie all service requests and responses to the original transaction. The "TSP enablement" may be accomplished through instrumentation of the container (e.g., JEE container). Java Platform, Enterprise Edition or Java EE is a widely used platform for server programming in the Java programming language.

Figure 5:
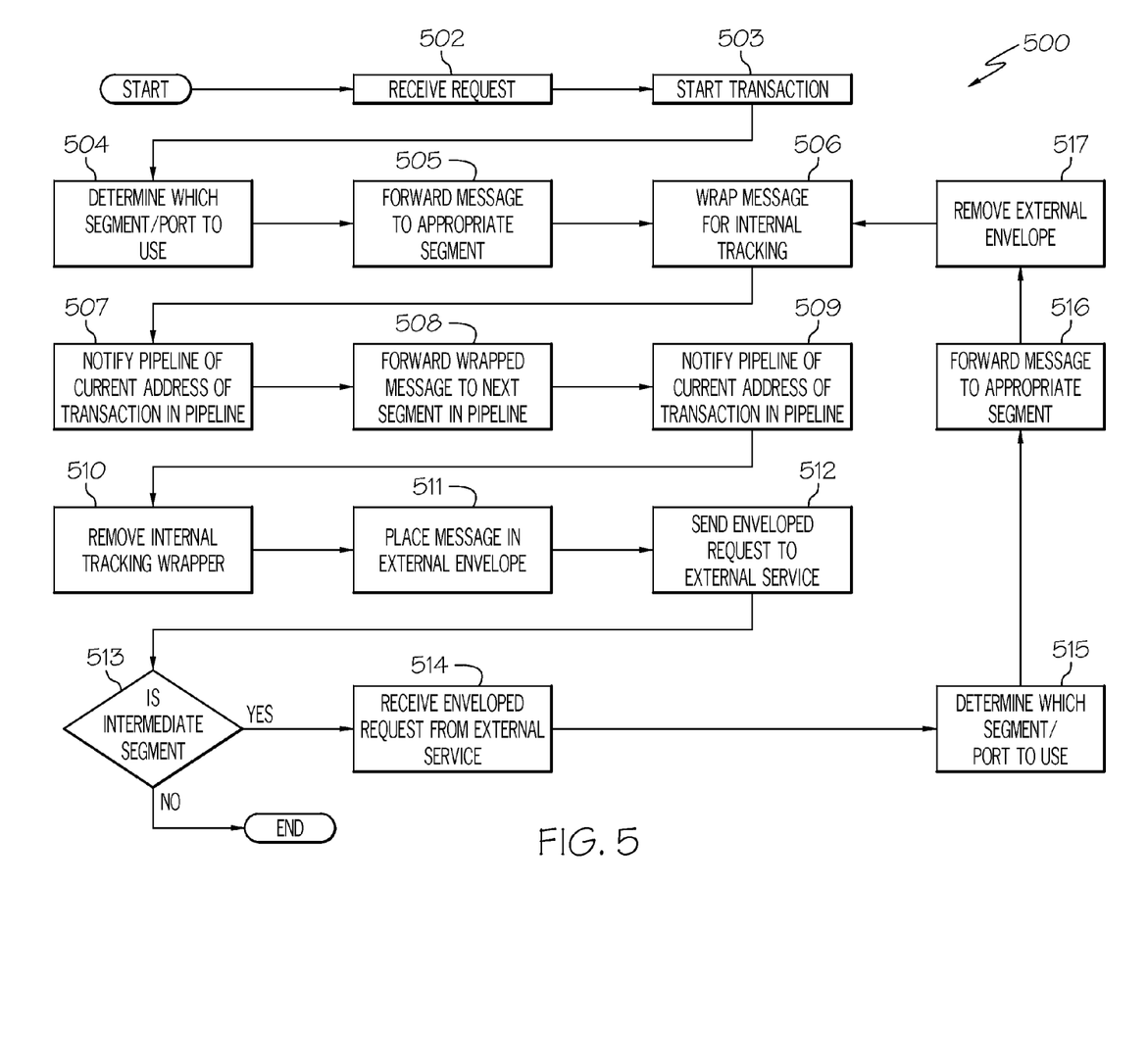
FIG. 5 shows a method of the general structure of a pipeline according to embodiments of the present invention.
Figure 6:
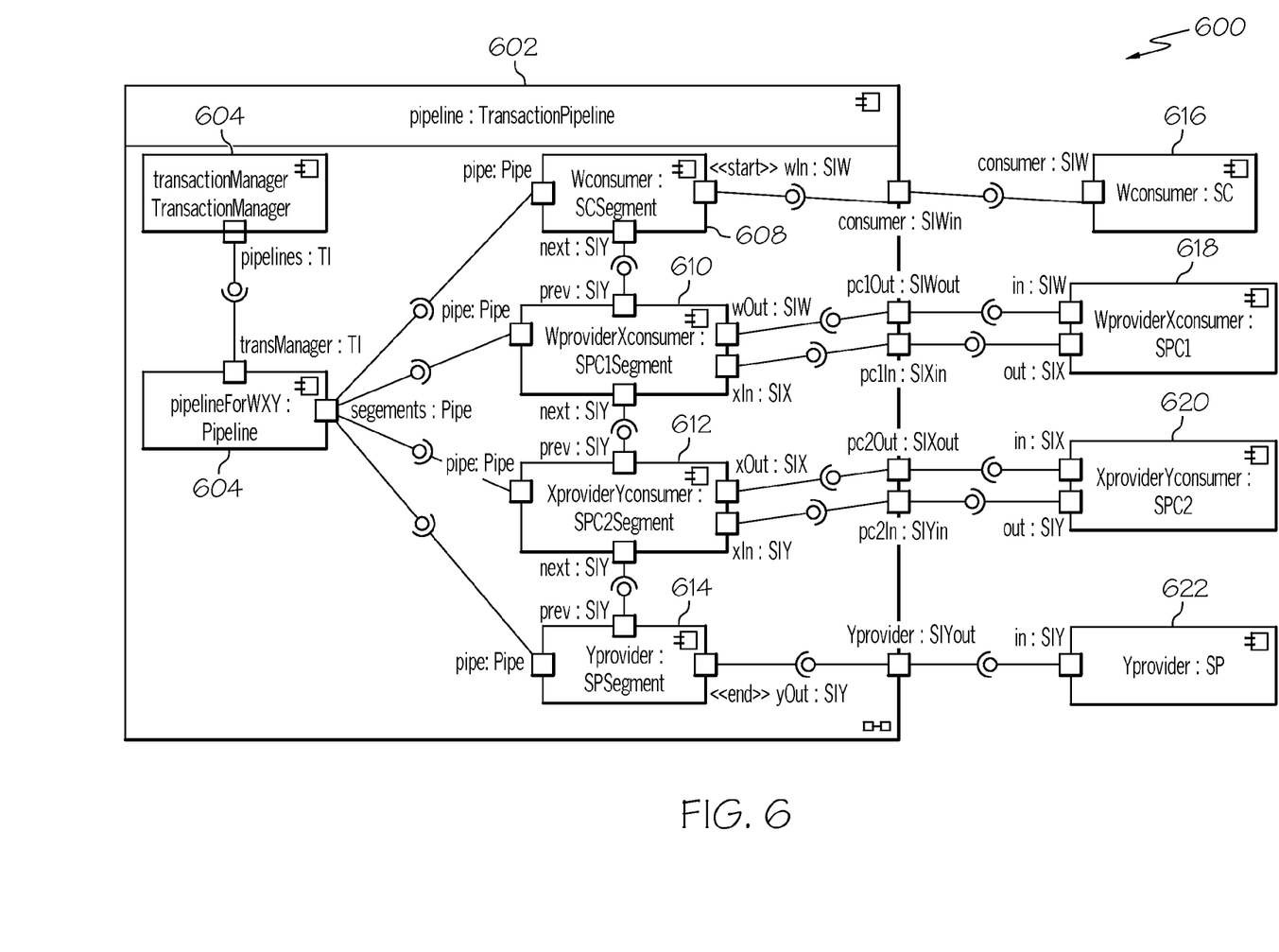
FIG. 6 shows an example of a transaction pipeline of according to embodiments of the invention.

FIG. 5 shows a method 500 for connecting inputs and outputs of multiple services to track an entire transaction from beginning to end and from service to service by passing a transaction token up and down a pipe 602 (FIG. 6). In the first step, a request sent by a service consumer is received by the pipeline 502, which may require authentication and/or authorization. It then starts a transaction and creates a transaction token 503. The pipeline uses mapping to determine which pipe segment and port to receive the request 504. The pipeline then forwards the request message to the appropriate pipeline segment port 505. The request message is then wrapped with the transaction token for internal tracking 506 and the pipeline 408 is notified of the current pipeline address of the transaction 507. Then, the next step may be passing the message and token's history with the token 508. The next steps may be tracking the transaction between the components in the pipeline from beginning to end 509 and using a transactional single sign-on identity for the entire pipeline that can be used for a Database Management System (DBMS) level audit trails. The message is prepared for an external service provider by stripping off the internal tracking wrapper 510 and placing the message request in a standardized external envelope that would be recognized by the external service 511. The pipeline then sends the enveloped message to the external system for processing 512. If the current pipeline segment is a terminal segment, then the pipeline processing can end (518). If the current segment is an intermediate segment, then the external service will require the service of another node in the pipeline and the pipeline will receive a request 514. The pipeline uses its mapping mechanism to determine which segment and port to return control 515. The pipeline forwards the message to the appropriate segment port 516. Then the external envelope is removed and its tracking information is used to determine the transaction token 517. The transaction token is wrapped up with the message 506 and the steps continue in a loop until a terminal segment is encountered.

FIG. 6 shows an example of a Transaction Pipeline 602 having a Transaction Manager 604 for the Pipeline 606 that provides pipeline infrastructure for WCconsumer: SC 616, WProviderXConsumer: SPC1 618, XProviderYConsumer: SPC2 620 and YProvider: SP 622. The incoming port (consumer: SIWin) collaborates with Transaction Pipeline 602 to identify the pipeline, segment, and port to forward the request to the pipeline segment (SC Segment) that corresponds to the requesting pipeline consumer. The consumer port may be attached to many pipelines, and must dynamically map external ports to segment ports. The segment, if the first in the pipeline, initiates the creation of a transactional context. Before forwarding the message to the next pipeline segment, the current segment unwraps the message body from the external envelope and wraps the message in a transaction aware envelope. For tracking purposes, the segment informs the Pipeline of the current pipe location of the Transaction. In this example, all messages are synchronous, requiring the transaction end to be after the return of the message to the next segment.

When the next pipe segment receives the transaction from the previous pipe segment, it first informs the pipe of the new location of the transaction. It then prepares the message by stripping it of the internal tracking information and puts it into an envelope for external tracking, then sends it through the outgoing port (SIWout in the example) to the provider of the service (SPC1 in the example).

In order for an intermediate node (SPC1 618 for example) to satisfy its incoming request, that node may require information in the next pipeline segment (using service interface SIX in the example). In order to get that information, that intermediate node SPC1 618 connects back to the pipeline, this time as a consumer through an incoming port (SIXin in the example). The intermediate node SPC1 618 must follow the TSP service protocol by sending the pipeline request in an envelope that contains the same pipe and message id as the envelope in which it received the request, thus maintaining the transactional information. The incoming port (SIXin in the example) collaborates with the TransactionPipeline to route the incoming request based on the envelope of the message. When the pipe segment for the intermediate node (SPC1Segment in the example) receives the request for a service, it rewraps the message by stripping off the external message envelope and wraps it in a transactional envelope.

The pipe segment then uses the transactional information to inform the pipeline of the current location of the transaction, and then forwards the message to the next segment in the pipeline. When the result returns from the next segment in the pipeline, the current segment informs the pipeline of the return to that segment.

Figure 7:
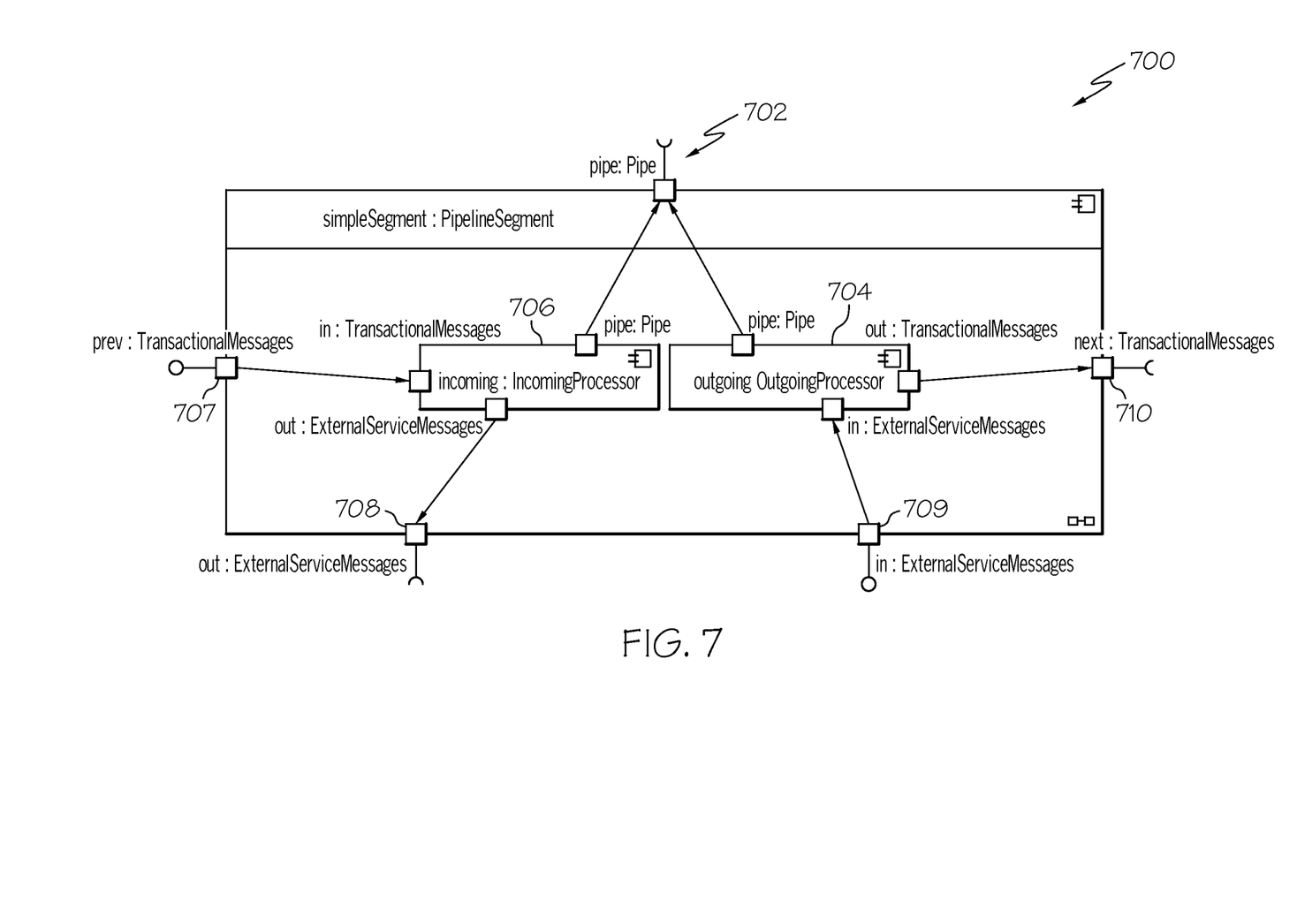
FIG. 7 shows a structural example of a segment of the pipeline according to embodiments of the invention.

Other processor configurations of pipeline segments could be used for different purposes. For example, the SC Segment 608 may only have an outgoing processor. The SP Segment 614 may only have an Incoming Processor 706. Segments that branch might have multiple Outgoing Processors 704 (FIG. 7). Segments that join might have multiple incoming processors, etc.

FIG. 7 shows an example of a pipeline segment 700 having Input Port 707 relaying requests to Incoming Processor 706. Incoming Processor 706 receives transactional messages from the previous segment and transforms them into external service messages, sending them to an external service via port 708. Outgoing Processor 704 transforms service requests needed by the external service from port 709 to internal format and forwards the request to the next pipeline segment via port 710. FIG. 7 shows a typical example, which has a single incoming processor and a single outgoing processor. A pipeline segment may have zero or more incoming processors and zero or more outgoing processors. The pipeline segment must be configured to have at least one processor (either incoming or outgoing).

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for connecting inputs and outputs of multiple services to track an entire transaction from beginning to end and from service to service. For example, in one embodiment, the invention provides a computer-readable/useable medium for connecting inputs and outputs of multiple services to track an entire transaction from beginning to end and from service to service. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for connecting inputs and outputs of multiple services to track an entire transaction from beginning to end and from service to service. In this case, a computerized infrastructure can be provided for performing the process steps of the invention can be obtained (e.g., created, purchased, used, modified, etc.) and deployed to the computerized infrastructure. To this extent, the deployment of a system can comprise one or more of (1) installing code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for connecting inputs and outputs of multiple services to track an entire transaction from beginning to end and from service to service. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for connecting inputs and outputs of multiple services to track an entire transaction from beginning to end and from service to service in a pipeline architecture, the system comprising:
at least one processing unit;
memory operably associated with the at least one processing unit;
a transactional service pipeline (TSP) executable by the at least one processing unit, the TSP having a series of nodes connecting a plurality of segments end-to-end in a pipeline configuration such that an output of each segment of the plurality of segments is supplied directly, without the use of a bus, to an input of another segment of the plurality of segments, each node providing processing or filtering before passing information to the next node in the TSP, and passing information tracked by a token having an ID and context, through the TSP, wherein each of the plurality of segments is a proxy for a service;
one or more consumers using the TSP to receive the information, and potentially further process and pass on the information; and
one or more providers used by the pipeline to receive and process the information.

2. The system as defined in claim 1 further comprising forks and branches within the pipeline of the TSP for controlling the passing of transaction tokens from node to node.

3. The system as defined in claim 2 further comprising a lightweight virtual attribute provenance pipeline (LVAPP) for connecting virtual attribute enabled directories (VAEDs) to corresponding sources of data.

4. The system as defined in claim 3 further comprising a Trust and Provenance Pipeline (TPP).

5. The system as defined in claim 4 further comprising an Enterprise Services Pipeline (ESP) between the LVAPP and the TPP.

6. A method in a system having a transactional service pipeline (TSP) for connecting inputs and outputs of multiple services to track an entire transaction from beginning to end and from service to service, the method comprising:
a computer passing a transaction token up and down the TSP, the TSP having a series of nodes connecting a plurality of segments end-to-end in a pipeline configuration such that an output of each segment of the plurality of segments is supplied directly, without the use of a bus, to an input of another segment of the plurality of segments, each node providing processing or filtering before passing information to the next node in the TSP, and passing information tracked by a token having an ID and context, through the TSP, wherein each of the plurality of segments is a proxy for a service;
the computer passing the transaction token's history with the transaction token; and
the computer providing, by the TSP, provenance to one or more consumers.

7. The method as defined in claim 6 further comprising the computer tracking a transaction between components in the TSP from beginning to end.

8. The method as defined in claim 7 further comprising the computer using a transactional single sign-on identity for the entire TSP that can be used for a Database Management System (DBMS) level audit trails.

9. The method as defined in claim 8 further comprising the computer connecting the TSP consumers to sources of data.

10. The method as defined in claim 9 further comprising:
the computer tracking the TSP provenance through all of its sources; and
the computer calculating a trust level value, which determines if the transaction should proceed to completion.

11. A computer-readable storage device storing computer instructions, which are executed to enable a system having a Transactional Service Pipeline (TSP) operating to connect inputs and outputs of multiple services to track an entire transaction from beginning to end and from service to service to perform steps comprising:
passing a transaction token up and down the TSP, the TSP having a series of nodes connecting a plurality of segments end-to-end in a pipeline configuration such that an output of each segment of the plurality of segments is supplied directly, without the use of a bus, to an input of another segment of the plurality of segments, each node providing processing or filtering before passing information to the next node in the TSP;
passing the transaction token's history with the transaction token; and
providing, by the TSP, provenance to one or more consumers.

12. The computer-readable storage device as defined in claim 11, wherein the steps further comprise tracking the transaction between components in the TSP from beginning to end.

13. The computer-readable storage device as defined in claim 12, wherein the steps further comprise using a transactional single sign-on identity for the entire TSP that can be used for Database Management System (DBMS) level audit trails.

14. The computer-readable storage device as defined in claim 13, wherein the steps further comprise connecting the TSP, consumers, and providers to sources of data.

15. The computer-readable storage device as defined in claim 14, wherein the steps further comprise:
tracking the TSP provenance through all of its sources; and
calculating a trust level value, which determines if the transaction should proceed to completion.

16. A method for deploying a system for connecting inputs and outputs of multiple services of a transactional service pipeline (TSP) to track an entire transaction from beginning to end and from service to service, the method comprising:
a computing device passing a transaction token up and down the TSP, the TSP having a series of nodes connecting a plurality of segments end-to-end in a pipeline configuration such that an output of each segment of the plurality of segments is supplied directly, without the use of a bus, to an input of another segment of the plurality of segments, each node providing processing or filtering before passing information to the next node in the TSP;
the computing device passing the transaction token's history with the transaction token; and
the computing device providing, by the TSP, provenance to one or more consumers.

17. The method as defined in claim 16 further comprising the computing device tracking a transaction between components in the pipeline from beginning to end.

18. The method as defined in claim 17 further comprising the computing device using a transactional single sign-on identity for the entire TSP that can be used for Database Management System (DBMS) level audit trails.

19. The method as defined in claim 18 further comprising the computing device connecting the TSP, consumers, and providers to sources of data.

20. The method as defined in claim 19 further comprising:
the computing device tracking the provenance through all of its source; and
the computing device calculating a trust level value, which determines if the transaction should proceed to completion.

* * * * *